Figure 1:
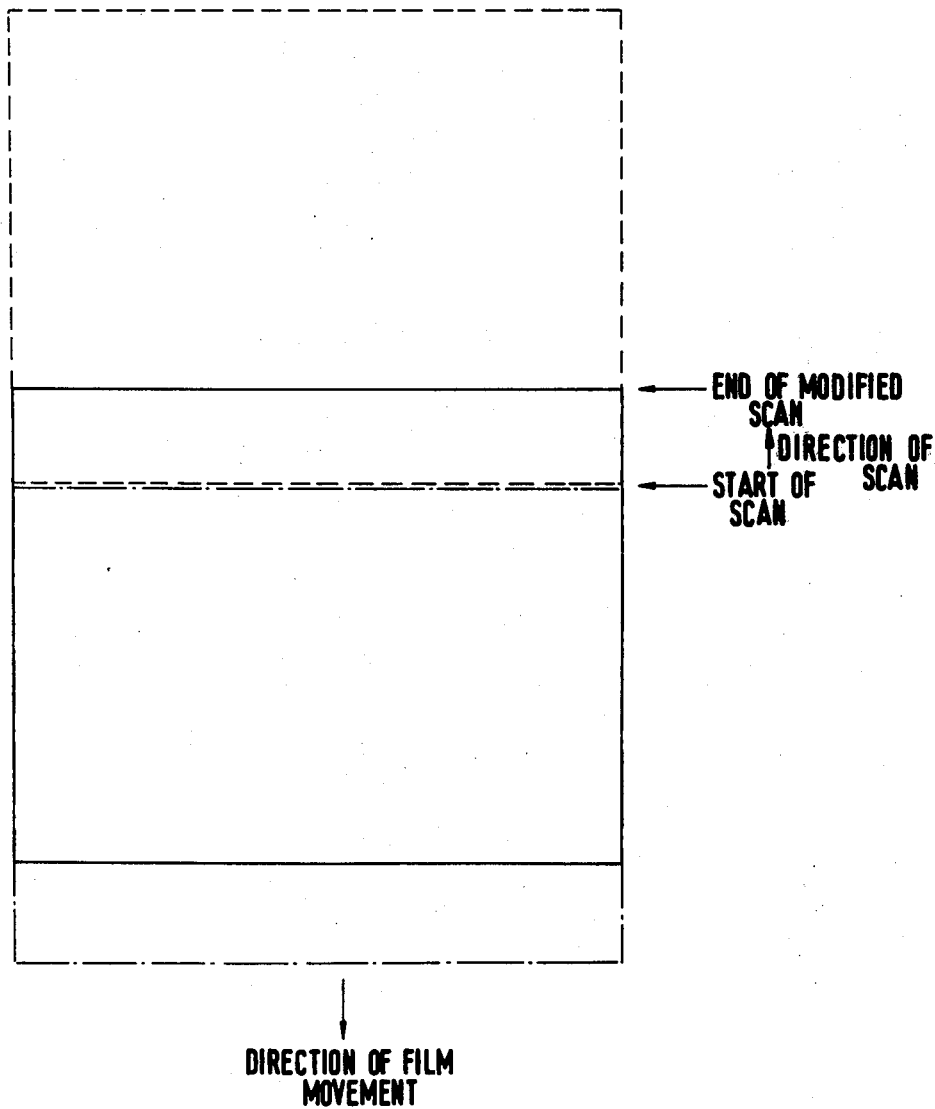

United States Patent [19]

Millward

[11] 4,127,869

[45] Nov. 28, 1978

[54] TELEVISION APPARATUS

[75] Inventor: John D. Millward, Hitchin, England

[73] Assignee: The Rank Organisation Limited, London, England

[21] Appl. No.: 846,567

[22] Filed: Oct. 28, 1977

[30] Foreign Application Priority Data

Oct. 28, 1976 [GB] United Kingdom ............... 44819/76

[51] Int. Cl.² ........................................... H04N 9/11
[52] U.S. Cl. ..................................... 358/54; 358/214
[58] Field of Search .......................... 358/54, 214, 216

[56] References Cited

U.S. PATENT DOCUMENTS

| 2,517,797 | 8/1950 | McFarlane | 358/214 |
| 2,590,281 | 3/1952 | Sziklai et al. | 358/214 |

Primary Examiner—Richard Murray
Attorney, Agent, or Firm—Brisebois & Kruger

[57] ABSTRACT

In a flying spot telecine apparatus, the horizontal scanning frequency is increased above the standard frequency to permit sequential scanning. The resultant signal is then processed electronically to provide signals suitable for a normal interlaced picture display.

3 Claims, 3 Drawing Figures

TELEVISION APPARATUS

This invention relates to a flying spot telecine apparatus.

A flying spot telecine apparatus is, for the purposes of the present specification, an apparatus in which successive frames of a cinema film are optically scanned in raster fashion by a light beam of small cross-section (flying spot), the picture information thereby modulated on the light beam is converted by one or more optoelectronic detectors into electrical video signal form, and from the elctrical video information there is derived by video processing circuits a television signal of which successive adjacent groups of television fields contain picture information derived from scanning respective successive film frames.

In flying spot telecines for the U.S. 525 line/60 field television system the cinema film is driven at 24 frames per second and the successive groups of fields contain three and two fields alternately, and in the European 625 line/50 field television system the film is driven at 25 frames per second and the successive groups of fields contain two fields each. In both television systems the television signal is interlaced which means that each complete television picture of 625 or 525 lines is composed of two consecutive fields (known as a television frame) of $312\frac{1}{2}$ and $262\frac{1}{2}$ lines each respectively, the lines of the two fields being interlaced upon reproduction on the television screen to produce 625 or 525 lines.

Existing commercially available flying spot telecines are one of two types — intermittent film motion and continuous film motion. The intermittent type at present can handle only a limited range of film sizes satisfactorily, and even so wear and tear is a problem. The continuous type generally uses either twin lens scanning, which cannot however be used on the U.S. 525/60 system where the field frequency is not twice the film frame rate, or the jump scan technique which suffers from the disadvantage of requiring very accurate registration of two field scans on the 625/50 system and five field scans on the 525/60 system. It is generally thought that a flying spot telecine with continuous film motion would provide the simplest and best telecine if the problems of field to field registration could be overcome.

One method of overcoming this problem would be to scan each film frame once only in sequential mode, and convert to interlaced mode after scanning. In conventional interlaced scanning, both in flying spot telecines and television camera tubes, alternate lines only are scanned in the first field of each television frame and the intervening lines are scanned in the second field of the television frame. Thus the lines are scanned in the order in which they are reproduced on the television screen. The major problem with interlaced scanning in flying spot telecines with continuous motion is registration, as mentioned above. Due to the movement of the film during the interval between the interlaced scans the scan has to be moved very accurately to follow the film to maintain accurate registration of the two interlaced fields. In sequential scanning, however, the lines are scanned not in the order in which they are reproduced on the screen but in the order in which they are positioned on the screen — i.e. they are scanned in sequence and not alternately. Thus the scanning raster used for sequential scanning has twice the number of lines (and half the line spacing) as that used for interlaced scanning, but since the sequential scan takes place over two television fields the horizontal or line frequency is the same. Clearly, since domestic television receivers are adapted to handle interlaced signals only, the lines of picture information derived by sequential scanning must be transposed into interlaced form prior to transmission. This can be done by storing the sequential signal and withdrawing the lines from storage in the appropriate order. This operation can be performed, in the case of a colour television signal, either upon the individual colour value signals derived from the detection of the modulated flying spot or after encoding the signals in conventional manner.

Although the sequential scanning approach solves the problem of registration, since each frame is scanned once only, a particular problem arises in relation to such systems operating according to the 625 line/50 field system when using a cathode ray tube as the light source. Using a sequential scan in the 625/50 mode results, for the reason which will be described later in relation to FIG. 1, in a very small scan height on the face plate of the tube and a consequent high screen current density such that the phosphor and face plate would burn very rapidly, and tube costs would make the system uneconomical. It is an object of the present invention to mitigate this problem.

According to the present invention there is provided in a flying spot telecine apparatus adapted for operation according to the 625/50 television standard and comprising means for driving a cinema film past a scanning position at a rate of 25 film frames per second, means for optically scanning consecutive frames of the cinema film in raster fashion with a light beam of small cross-section, optoelectronic detector means for converting the picture information thereby modulated on the light beam into electrical video signal form, and video processing circuit means for deriving from the electrical video information a television signal comprising consecutive groups of two interlaced television fields containing picture information derived from scanning respective consecutive film frames, the improvement wherein the film driving means is adapted to drive the film with continuous motion, wherein the scanning means is adapted to scan each film frame in sequential mode at a line frequency greater than the standard line frequency and with a vertical scan deflection magnitude greater than would be necessary if the frame were scanned sequentially at the standard line frequency, and wherein the video processing circuits means includes means for converting the telectrical video information derived by the scanning into interlaced form and to the standard line frequency.

By scanning with an increased line frequency a degree of vertical deflection is necessary to fully cover the film frame with the result that the current density on the face plate is reduced.

Figure 2:
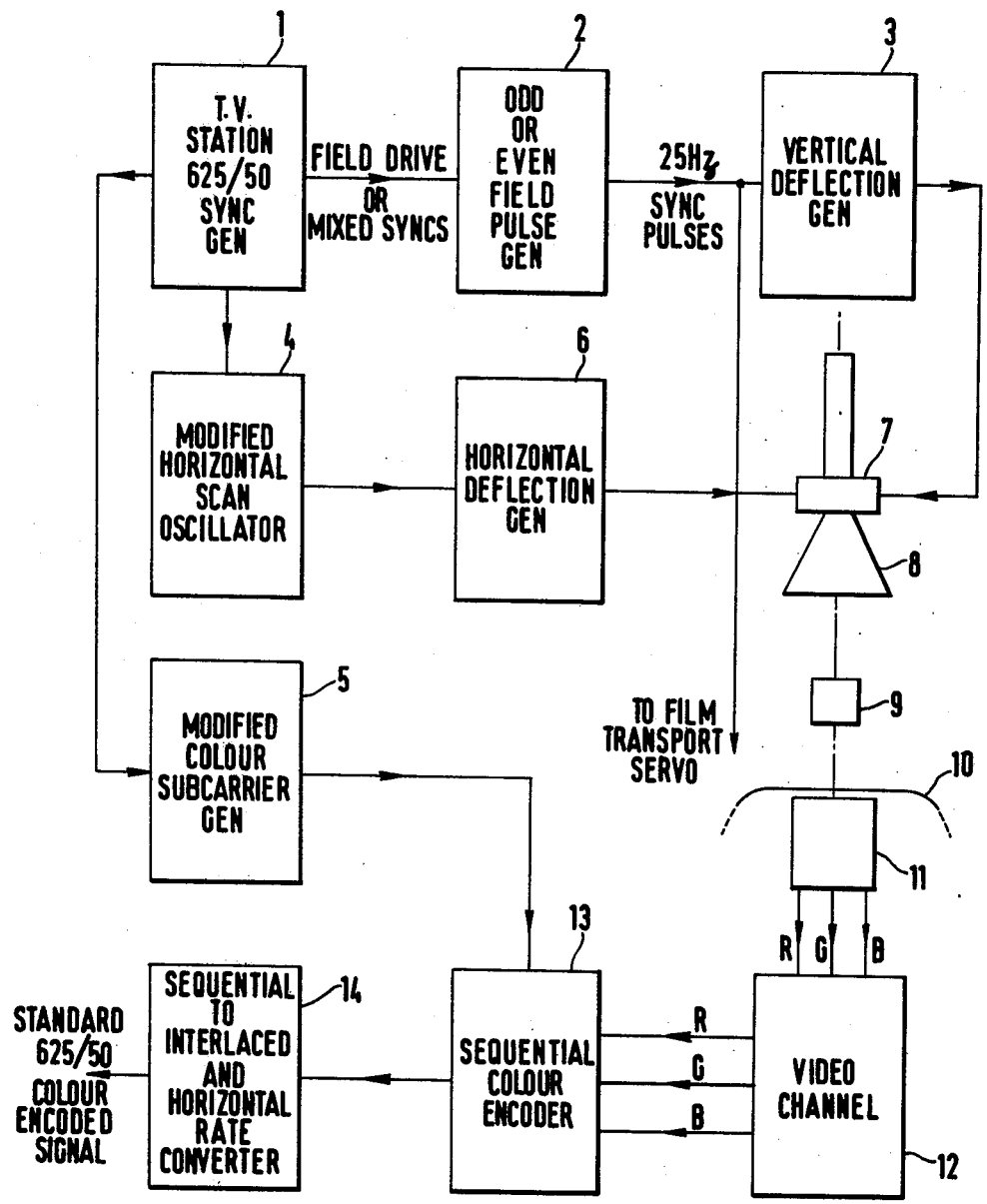
Figure 3:
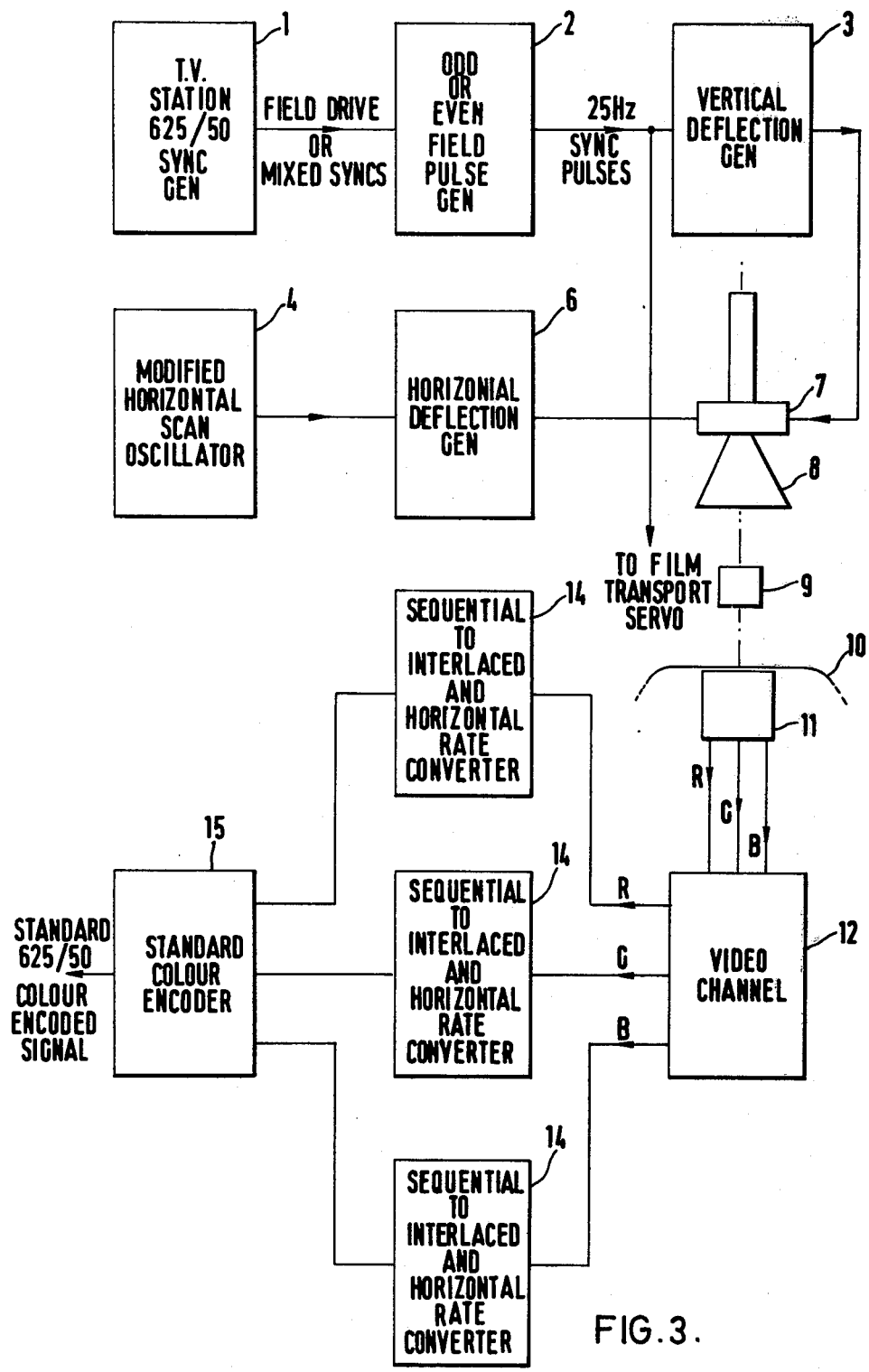

Embodiments of the invention will now be described by way of example, with reference to the accompanying drawings, in which:

FIG. 1 is a schematic diagram to help in understanding the disadvantage of sequential scanning at normal line frequency and the improvement obtained by increasing the scanning line frequency, FIG. 2 is a block diagram of a first embodiment of a flying spot telecine apparatus according to the invention, and FIG. 3 is a block diagram of a second embodiment of a flying spot telecine apparatus according to the invention.

On the 625/50 television standard the film velocity is 25 frames per second. If we consider that the film frames are touching, each film frame will move a distance equal to its height in one twenty fifth of a second. This is shown in FIG. 1 where the dashed rectangle represents the position of a film frame at a given point along its path and the dot-dashed rectangle represents the position of the same film frame after one twenty fifth of a second.

Assume now that the full height of each picture frame is to be scanned with 625 lines sequentially in one twenty fifth of a second, in other words at a line frequency of 15625 HZ which is the standard line frequency for the 625/50 system, with the scanning of each frame beginning, as shown in FIG. 1, at the lower edge of the frame when in the position represented by the dashed rectangle.

In these circumstances it is clear that the vertical scanning of the film frame is accomplished entirely by the movement of the frame itself, since the frame moves through its full height (to the dot-dashed position) in precisely the same time that the scanning beam executes 625 lines. This means that the required vertical deflection on the cathode ray tube generating the scanning light beam is zero, giving a single line scan on the tube.

Present day phosphors and glass face plates have an estimated life of at least 20,000 hours, but normally failure of the cathode limits the life of the tube to a few thousand hours. On the basis of a 4 × 3 raster giving a screen life of 20,000 hours a single line scan would increase the screen current density 625 times, and prorata, the screen life would be reduced to 32 hours. This is not economic and therefore to increase the tube life the screen current density has to be reduced.

This is accomplished, according to the invention by increasing the horizontal scanning frequency above the standard frequency. In this case scanning of the 625 lines is completed in less than the normal time of one twenty fifth of a second, and since the film frame will not have then moved through its full height, the vertical deflection will have to be increased from zero to an amount equal to the distance the film frame has yet to move if the full height of the frame is to be covered with the 625 lines. This will clearly reduce the current density on the face plate of the cathode ray tube.

This is shown in FIG. 1, where the full line rectangle represents the position of the film frame at the end of the modified (i.e. increased line frequency) scan with the modified scan of 625 lines ending at the upper edge of the frame. In practice the vertical deflection of the flying spot may continue throughout the remainder of the 1/25th second period while the frame moves from the full line position to the dot-dashed line position, with a resultant partial scanning of the next film frame. This is not a problem since the superfluous picture information so derived may be blanked at any convenient stage in the video processing after scanning, or alternatively the cathode ray tube can be blanked during this remaining period. All that is important is the first 625 lines during each 1/25th second period.

The picture information derived during the modified 625 line scan is, of course, sequential rather than interlaced and at a higher horizontal frequency than standard, although both the television frame period and film speed are normal at 25 frames per second. However, the technique of converting a sequential signal to an interlaced signal is, as has been previously mentioned, well known in the art, as is the technique for converting the horizontal scan rate back to the standard 15625 HZ, equivalent to 625 lines in 1/25th of a second.

In practice, due for example to the film frames not touching as assumed above, and/or to the film frames and television frames having different aspect ratios whereby only a part of the total height of each film frame is to be scanned, a degree of vertical deflection may be necessary even when using the standard line frequency for scanning. However, the magnitude of the vertical deflection required in such cases will generally be small, and will still lead to a reduced screen life. The invention is, of course, also useful in these cases, since by increasing both the magnitude of the vertical deflection and the frequency of the line scanning so as to sequentially scan the same height of each film frame as would be scanned using the standard line frequency and corresponding small vertical deflection magnitude, a substantial increase in screen life can still be obtained.

FIG. 2 shows, in block diagram form, a continuous motion flying spot telecine apparatus operating according to the 625/50 television standard and embodying the present invention.

In FIG. 2, reference 1 represents the conventional television station sync generator which is used for synchronising all picture sources in the usual manner, and is not to be regarded as part of the telecine apparatus itself. The pulse generator 2 accepts synchronising pulses from 1 and generates 25 HZ pulses necessary to synchronise the vertical deflection generator 3. The modified (i.e. increased line frequency) horizontal scan oscillator 4 is synchronised to the station sync generator 1 as is the modified colour sub-carrier generator 5 so that the modified colour sub-carrier (whose frequency is increased in proportion to the increase in line frequency) maintains a constant phase relationship with the horizontal frequency pulses produced by 4. This is necessary for correct colour encoding. The horizontal frequency pulses from the horizontal scan oscillator 4 synchronise the horizontal deflection generator 6.

The horizontal deflection generator 6 and vertical deflection generator 3 in conjunction with the scan deflector 7 produce a flying spot raster on the cathode ray tube 8 which is focussed on the film 10 by a lens system 9. The film 10 is driven with continuous motion at a constant 25 film frames per second by a servomechanism of known type (not shown) controlled by the 25 HZ pulses from the pulse generator 2. As discussed in connection with FIG. 1, the components, 3, 6 and 7 are arranged to produce a flying spot raster having a greater line frequency than the standard for the 625/50 system and a vertical deflection magnitude such that substantially the full height of each film frame is scanned with 625 lines, the magnitude of the vertical deflection being greater than that which would be necessary to scan the full height of each frame with 625 lines at the standard line frequency.

Photocells 11 produce red, green and blue video (colour value) signals which are processed in known manner by the video channel 12 and the sequential colour encoder 13 to form a signal colour encoded signal. Finally, the colour encoded signal is converted to normal 625/50 standards by the sequential-to-interlaced and horizontal rate converter 14.

In the embodiment of FIG. 3, most of the components are the same as in FIG. 2 and need not be described again. The difference in the embodiments is that the individual colour signals are converted to the 625/50 standard in respect of line frequency and interlacing before colour encoding. Thus three sequential-to-interlaced and horizontal rate converters 14 are used, one for each colour signal, and a standard colour encoder 15 is used rather than the sequential encoder 13 of FIG. 2.

I claim:

1. In a flying spot telecine apparatus adapted for operation according to the 625/50 television standard and comprising means for driving a cinema film past a scanning position at a rate of 25 film frames per second, means for optically scanning consecutive frames of the cinema film in raster fashion with a light beam of small cross-section, optoelectronic detector means for converting the picture information thereby modulated on the light beam into electrical video signal form, and video processing circuit means for deriving from the electrical video information a television signal comprising consecutive groups of two interlaced television fields containing picture information derived from scanning respective consecutive film frames, the improvement wherein the film driving means is adapted to drive the film with continuous motion, wherein the scanning means is adapted to scan each film frame in sequential mode at a line frequency greater than the standard line frequency and with a vertical scan deflection magnitude greater than would be necessary if the frame were scanned sequentially at the standard line frequency, and wherein the video processing circuit means includes means for converting the electrical video information derived by the scanning into interlaced form and to the standard line frequency.

2. A flying spot telecine apparatus according to claim 1, wherein the opto-electronic detector means is adapted to convert the information modulated on the light beam to a plurality of colour value signals, and wherein the video processing circuit means is adapted to first individually convert the colour value signals into interlaced form and to the standard line frequency and to then colour encode the individually converted signals into a single signal.

3. A flying spot telecine apparatus according to claim 1, wherein the opto-electronic detector means is adapted to convert the information modulated on the light beam to a plurality of colour value signals, and wherein the video processing circuit means is adapted to first colour encode the colour value signals into a single signal and to then convert the single encoded signal to interlaced form and to the standard line frequency.

* * * * *